Dec. 3, 1968

E. U. SOWERS III 3,413,994

VARIABLE GAIN PROPORTIONAL AMPLIFIER

Filed Aug. 18, 1965

INVENTOR
EDWIN U. SOWERS, III

BY Hurvitz & Rose

ATTORNEYS

United States Patent Office 3,413,994

Patented Dec. 3, 1968

3,413,994

VARIABLE GAIN PROPORTIONAL AMPLIFIER

Edwin U. Sowers III, Silver Spring, Md., assignor to Bowles Engineering Corporation, Silver Spring, Md., a corporation of Maryland Filed Aug. 18, 1965, Ser. No. 480,674
8 Claims. (Cl. 137—81.5)

This invention relates to pure fluid operated systems and particularly to a pure fluid analog amplifier having a variable gain.

Electronic systems and components are capable of performing functions such as detecting and amplifying a signal. Mechanical systems, utilizing a large number of moving parts are also known which will perform functions analogous to the functions of electronic systems. However, both electronic and mechanical systems utilize a large number of active elements, a failure in any of which usually results in improper operation of the system.

The present invention relates generally to fluid amplifier systems having no moving solid parts and, more specifically, to such systems in which amplification is a function of the magnitude of the deflection of a main jet of a fluid by a transverse fluid pressure distribution within a defined interaction region. Systems of this type have been discussed in U.S. Patent No. 3,122,165, granted Feb. 25, 1964. Fluid amplifiers have been distinguished by control characteristics into four broad classes, which are:

(I) Those amplifiers wherein two or more jets of fluid interact so that one or more of these jets deflect another jet with little or no interaction between the sidewalls which define the interaction region or chamber. These devices of the first class include an interchange of momentums of the jets.

(II) Those amplifiers wherein two or more jets of fluid interact so that the resulting flow patterns and pressure distributions within the interaction region are greatly affected by the details of the configuration of the sidewalls which define the interaction chamber.

(III) Vortex amplifiers.

(IV) Turbulence and coupled mode amplifiers.

Fluid amplifiers have been also distinguished by output characteristics into these broad classes, which are:

(I) Those amplifiers wherein pressure is amplified. Maximum pressure of the power jet is usually found in a relatively narrow central region along the longitudinal axis of the jet, the pressure rapidly decreasing as one moves away from the axis. Therefore, the outlet means of the pressure amplifier which receives the power jet after it has been effected by the control jets is constructed to sense a narrow region of the jet profile so that small-deflection deflection angles produce large changes in the pressure of the portion of the power jet sensing by the outlet receiving means. Pressure amplifiers may be used, for example, if the output fluid of the amplifier is to drive a diaphragm actuated valve or a subsequent fluid amplifier.

(II) Those amplifiers wherein mass flow is amplified. The outlet means of the mass flow amplifier which receives the power jet is constructed to receive all of the fluid in the power jet including fluid which has been entrained in the jet. Such amplifiers are used where a large volume of flow is required and a small pressure amplification is acceptable.

(III) Those amplifiers wherein power is amplified. If, for example, hydraulic power is to be amplified then the outlet means of the power amplifier which receives the power jet is constructed so that the product of the pressure and the volume flow of the fluid is maximized.

Such amplifiers are used to drive a mechanical load for performing work.

The present invention is illustrated by an amplifier having the characteristics of Classes I, but may be applied to amplifiers having the other enumerated characteristics.

It is an object of the invention to provide an analog amplifier wherein the gain characteristic may be selectively varied.

It is another object to provide a pure fluid amplifier wherein the gain characteristic for pressure may be selectively varied.

It is another object to provide a pure fluid pressure amplifier wherein the gain characteristic may be selectively varied between a minimum and a maximum.

It is still another object to provide a throttler for the output of a pure fluid amplifier to selectively vary the output signal.

A feature of this invention is the provision of a means for selectively varying the output impedance of a pure fluid pressure amplifier to control the output pressure signal. This is accomplished by varying the effective cross-section area of the output channel.

The above and still further objects, features and advantages of the present invention will become apparent upon consideration of the following detailed description of specific embodiments thereof, especially when taken in conjunction with the accompanying drawings, wherein.

Figures 1, 3:
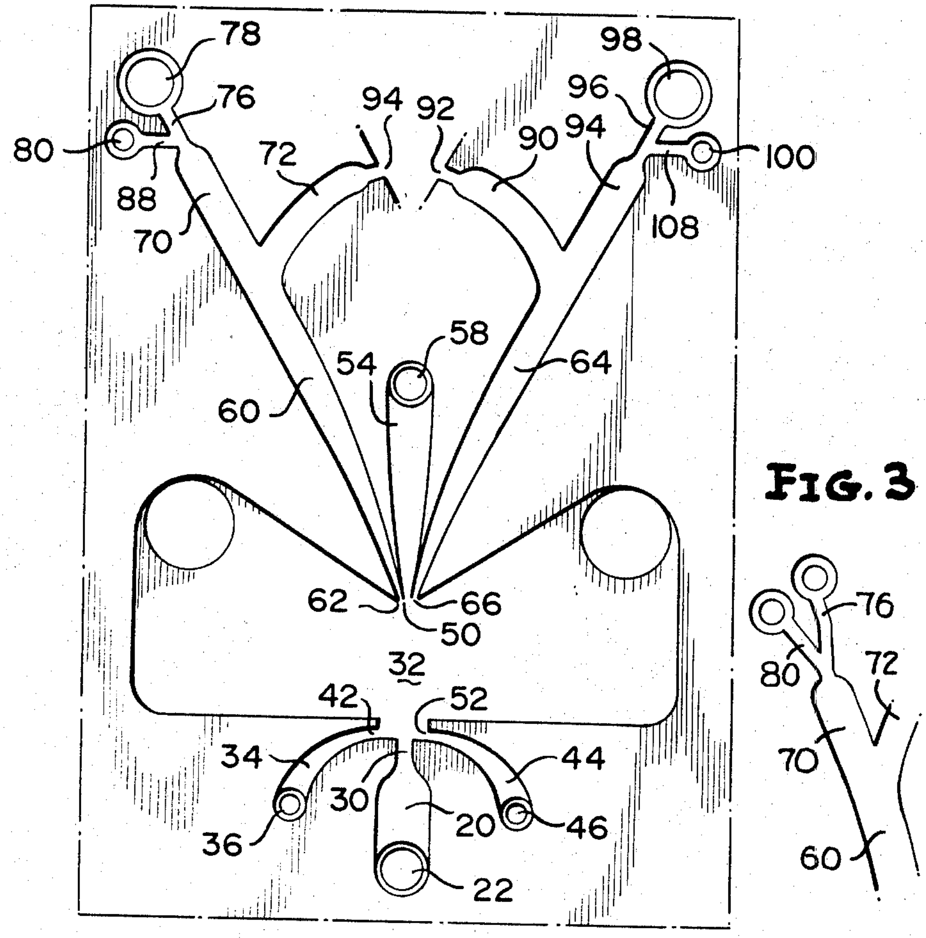
FIGURE 1 is a plan view of one embodiment of the amplifier of the present invention.
FIGURE 3 is a plan view of a portion of a second embodiment of the present invention.
Figure 2:
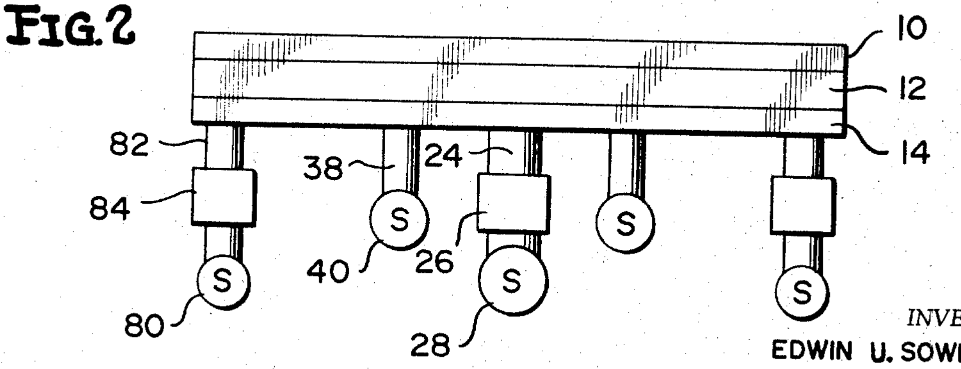
FIGURE 2 is an end view of the amplifier shown in FIGURE 1.

Referring now to the drawings, the amplifier comprises a sandwich of three plates, a top plate 10, a middle plate 12, and a bottom plate 14. The middle plate is cut out to provide the configuration of the amplifier, and the top and bottom plates are respectively sealed thereto by suitable means such as adhesive or machine screws to provide fluid-tight covers for the cut-out configuration.

A power nozzle 20 has an aperture 22 at one end thereof into which a tube 24 is tightly fitted. The tube 24 is coupled through a pressure regulator 26 to a source 28 of fluid under pressure. The other end of the nozzle 20 is formed into a throat or orifice 30 which is adapted to issue a power jet of fluid from the source 28 into an interaction chamber 32.

A left control nozzle 34 has an aperture 36 at one end thereof into which a tube 38 is tightly fitted. The tube 38 is coupled to a source 40 of fluid under a variable pressure. The other end of the nozzle 34 is formed into a throat or orifice 42 which is adapted to issue a control jet of fluid from the source 40 to strike the power jet after it has issued from the throat 30.

A right control nozzle 44 is similarly provided with an aperture 46, a tube 48, a source 50, and a throat 52 which is adapted to issue a control jet of fluid from the source 50 to strike the power jet after it has issued from the throat 30. The right and left control throats are axially aligned and opposed to each other.

At the opposite end of the interaction chamber 32 from the power throat 30 are three passageways. A center passageway 54 has an entrance 56 to the interaction chamber which is axially aligned with the power throat 30 and an exit aperture 58 which is normally open to the atmosphere and may be considered a "dump."

A left passageway 60 has an entrance 62 to the interaction chamber which is to the left of the axis of the power throat 30; and a right passageway 64 has an entrance 66 to the interaction chamber which is to the right of the axis of the power throat 30.

When the power jet of fluid initially issues from the power throat 30, it primarily flows through the interaction chamber 32 into the center passageway 54 and is dumped to the atmosphere. If a control jet of fluid issues from the left control throat 42, it will impinge on the power jet and, by momentum exchange, deflect the power jet towards the right passageway 66. Similarly, if a control jet of fluid issues from the right control throat 52, it will impinge on the power jet and, by momentum exchange, deflect the power jet towards the left passageway 62. If control jets issue concurrently from both the right and left control throats, the deflection of the power jet will be a function of the difference between the control jets. In general, the angular deflection of the power jet of fluid will be a function of nozzle area and of the velocity, density and direction of the interacting jets of fluid.

A pressure gradient exists transversely through the power jet of fluid. The pressure is at a maximum at the center of the power jet, and at a minimum at the jet boundary due to the jet boundary interactions with the ambient fluid in the interaction chamber. Thus, as the power jet of fluid is progressively deflected towards the passageway 60 or 64, a progressively higher pressure is developed in that passageway until the center of the power jet is received by that passageway.

The left passageway 60 extends away from the interaction chamber and bifurcates into a left throttle passageway 70 and a left output passageway 72. The output passageway has a constricted output aperture 74 to which a load device may be coupled. The throttle passageway includes a constrictor 76 leading to a dump aperture 78 which communicates with the atmosphere, i.e. sump environment of the amplifiers or other controlled pressure. A gain control aperture 80, which is coupled by a tightly fitted tube 82 through a pressure regulator 84 to a source 86 of fluid under pressure, leads through a constricted passageway 88 to the passageway 76.

The right passageway 64 may be similarly bifurcated with a right output passageway 90, a constricted output aperture 92, a right throttle passageway 94, a constricted passageway 96, a dump aperture 98, a gain control aperture 100, a tube 102, a pressure regulator 104, a source 106, and a constricted passageway 108.

Consider the condition of the power jet being deflected towards the left passageway 60. When no fluid is flowing from the left source 86 through the gain control aperture 80, a significant portion of the power jet entering the passageway 60 takes the path of least resistance out the dump aperture 78 to the atmosphere, and no significant output pressure is developed at the output aperture 74.

When the fluid flows from the gain control aperture 80, through the passageway 88 to the passageway 76, it tends to reduce the effective cross-sectional area of the passageway 76 which is available for the flow of the power jet to the dump aperture 78, that is to say, it "pinches" the passageway 76. At a given maximum flow from the gain control aperture 80, the passageway 76 is effectively pinched closed, and all of the power jet entering the passageway 60 is diverted to the output aperture 74 to provide a maximum output pressure for a given power jet deflector, or a maximum gain for the amplifier. At a flow from the gain control aperture which is less than the given maximum the passageway is effectively partly open, and part of the power jet entering the passageway 60 flows out the dump aperture 78 while the remaining part flows out the output aperture to produce an intermediate pressure for the given power jet deflector, or an intermediate gain for the amplifier. Deflection of the power jet towards the right passageway 64 is similarly treated.

Even better results are obtained if the passages 80 and 108 are directed towards the junction of passages 70 and 72 and 90 and 94, respectively. In this case, flow from the passages 80 and 108 not only pinch but also oppose the flow to passages 70 and 94, respectively. Such an arrangement of one group of passages is illustrated in FIGURE 3 where passage 80 lies at an acute angle relative to passage 70.

It will thus be seen that by varying the effective cross-section area of the passageway to the dump aperture, the fraction of the deflected power jet which is lost to the atmosphere and not available to the output aperture may be responsively varied, and thereby the gain, or the ratio of the pressure developed at the output aperture to the pressure applied at the input to the control throat, may be responsively varied.

The sources 86 and 106 may be sources of fluid signals responsive to a condition in a circuit or system or may be fixed sources with manually variable pressure controls in the passages to the passages 88 and 108. Thus signal variable or fixed amplifier gains may be provided. The former case has particular use in servo systems where it may be desired to have different gains over different ranges of error signal. Thus, fast response to deviation from null with a reduced response at higher errors is desired and therefore the gain of the unit is an inverse function of error signal. If hunting is a problem, then reduced gain about null may be provided.

While I have described and illustrated several specific embodiments of my invention, it will be clear that variation of the details of construction which are specifically illustrated and described may be resorted to without departing from the true spirit and scope of the invention as defined in the appended claims.

What I claim is:

1. A pure fluid proportional amplifier comprising an interaction chamber;

source means in fluid flow communication with said interaction chamber for providing a power jet thereto;

a passageway opening into said interaction chamber for receiving fluid of the power jet therefrom;

first control means operative within said interaction chamber for deflecting the power jet with respect to said passageway for varying the flow of fluid of the power jet into said pasageway;

utilization means in fluid flow communication with said passageway having a given impedance;

variable impedance means in fluid flow communication with said passageway;

means for controlling said variable impedance in response to a signal.

2. A pure fluid proportional amplifier comprising:

an interaction chamber;

source means in fluid flow communication with said interaction chamber for providing a power jet thereinto;

a passageway opening into said interaction chamber for receiving fluid of the power jet therefrom;

first control means operative within said interaction chamber for deflecting the power jet with respect to said passageway for varying the flow of fluid of the power jet into said passageway;

utilization means coupled to said passageway by a first aperture having a given cross-sectional area;

fluid dump means coupled to said passageway by a second aperture;

gain control means coupled to said second aperture for varying the effective cross-sectional area of said second aperture.

3. A variable gain proportional fluidic amplifier comprising an interaction region, output passages, a power nozzle for issuing a stream of fluid across said interaction region toward said output passages, and control means for determining the proportioning of said stream of fluid between said output passages, said output passages constituting elongated, relatively narrow, flow passages characterized in that at least one of said output passages divides into at least two confined flow channels and means effectively varying the cross sectional area of at least one of said flow channels for varying the resistance to flow of fluid through said one of said flow channels.

4. The combination according to claim 3 further characterized in that said means comprises a throat region in said one of said flow channels and means for introducing into said one of said channels in said throat region a further fluid flow.

5. The combination according to claim 4 further characterized in that said means for introducing is a further flow channel extending such as to direct fluid upstream relative to the direction of the flow of said stream of fluid issued by said power nozzle.

6. The combination according to claim 3 further characterized in that said means reduces the effective cross-sectional area of said one of said flow channels.

7. The combination according to claim 3 further characterized by both said output passages dividing each into a pair of confined flow channels, a pair of fluid amplifier control nozzles each connected to receive fluid from one confined flow channel of different pairs of confined flow channels and means located in each of the other confined flow channels of different pairs of said confined flow channels for concurrently and substantially equally varying the resistance to flow of fluid through both said other confined flow channels.

8. The combination according to claim 3 further characterized in that each of said confined flow channels are structurally arranged relative to the flow path of fluid in said passage to receive at least some of the stream of fluid in the absence of control by said means for varying resistance to flow.

References Cited

UNITED STATES PATENTS

| | | | |
|---|---|---|---|
| 3,159,168 | 12/1964 | Reader | 137—81.5 |
| 3,174,497 | 3/1965 | Sowers | 137—81.5 |
| 3,185,166 | 5/1965 | Horton et al. | 137—81.5 |
| 3,226,023 | 12/1965 | Horton | 137—81.5 X |
| 3,232,095 | 2/1966 | Symnoski et al. | 137—81.5 X |
| 3,258,023 | 6/1966 | Bowles | 137—81.5 |
| 3,270,960 | 9/1966 | Phillips. | |
| 3,272,215 | 9/1966 | Bjornsen et al. | 137—81.5 |
| 3,295,543 | 1/1967 | Zalmanzon | 137—81.5 |

SAMUEL SCOTT, *Primary Examiner.*